March 26, 1968 P. L. MAY ET AL 3,374,729
AGRICULTURAL APPARATUS
Filed June 23, 1965 7 Sheets-Sheet 1

INVENTOR.
CLYDE G. VIDRINE
PATRICK L. MAY
RALPH E. BEYER

Ralph Alvey
ATT'Y.

March 26, 1968
P. L. MAY ET AL
3,374,729
AGRICULTURAL APPARATUS
Filed June 23, 1965
7 Sheets-Sheet 2
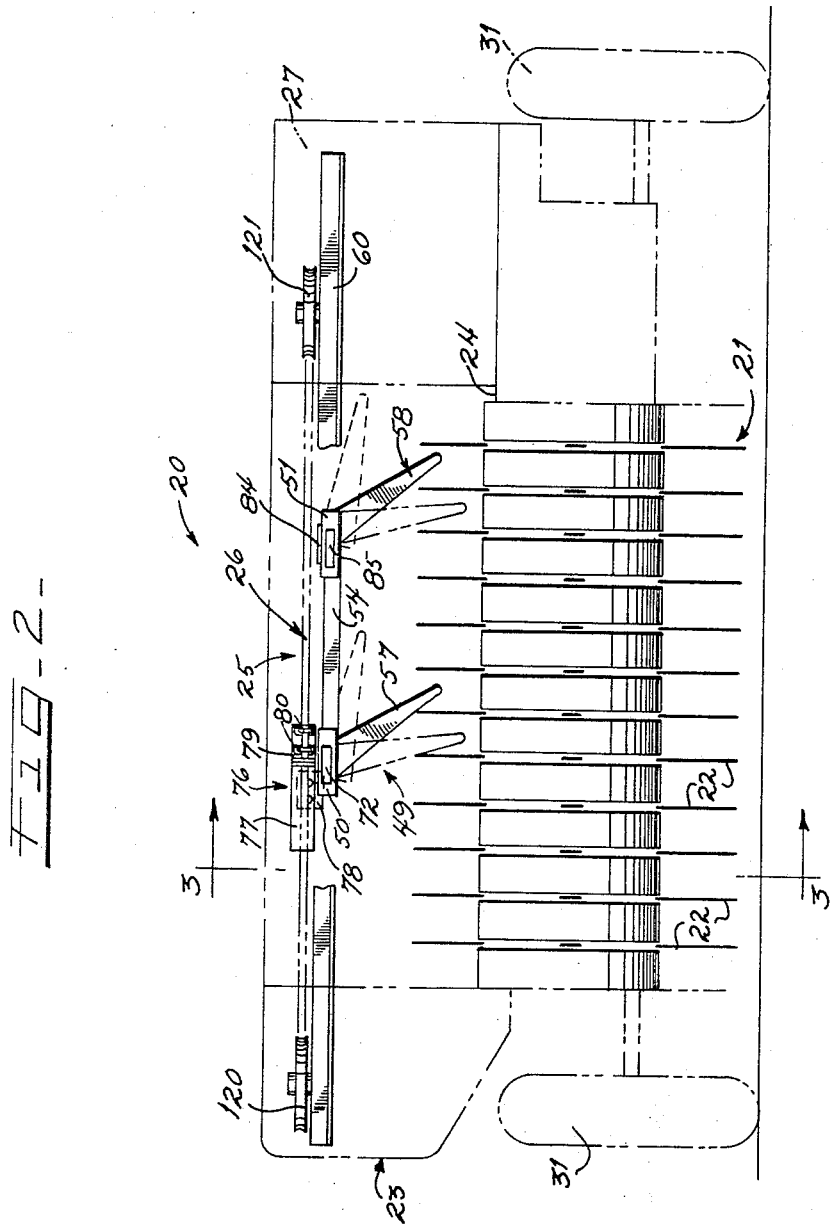
INVENTOR.
CLYDE G. VIDRINE
PATRICK L. MAY
RALPH E. BEYER
Ralph Alvey
ATT'Y.

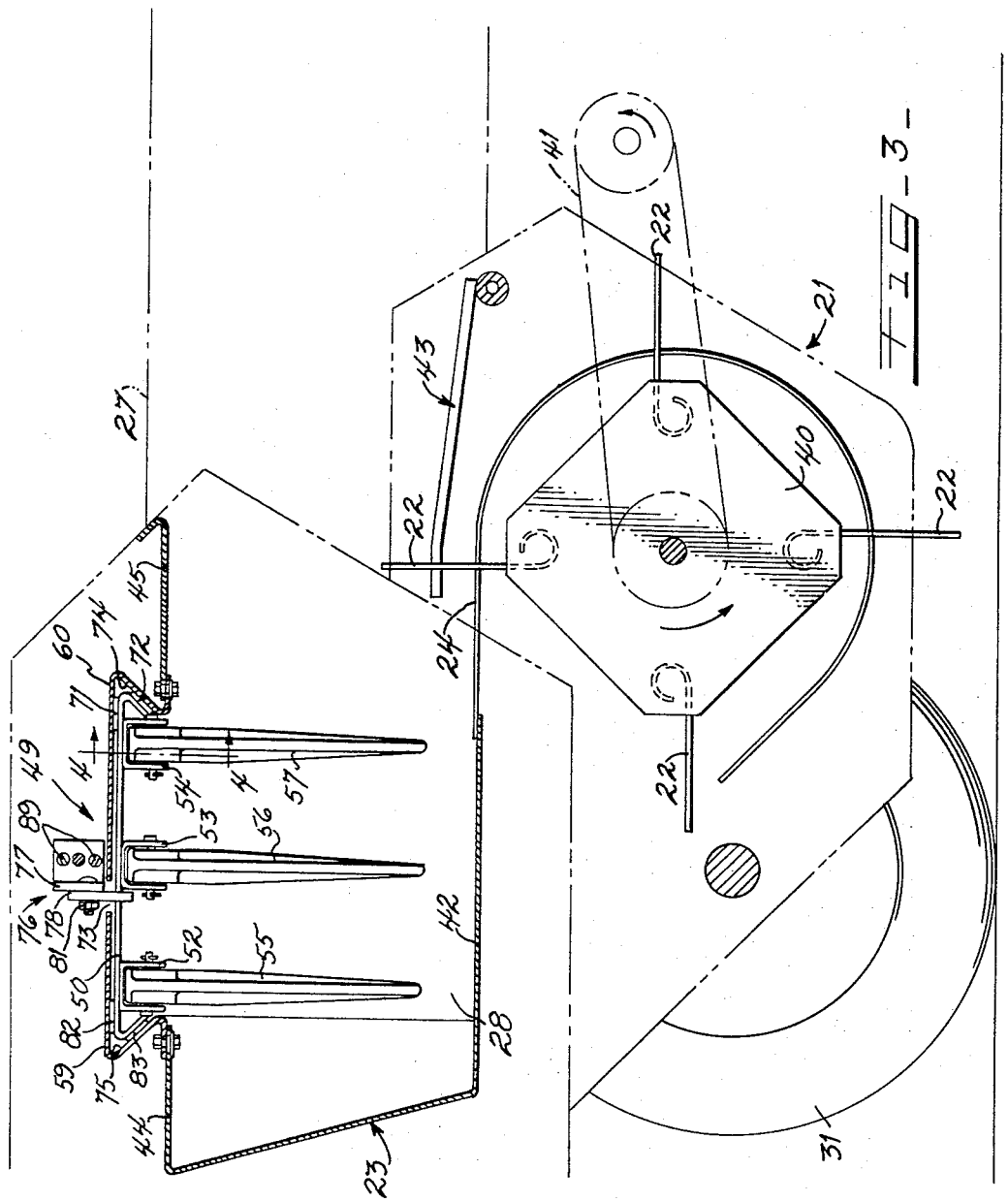

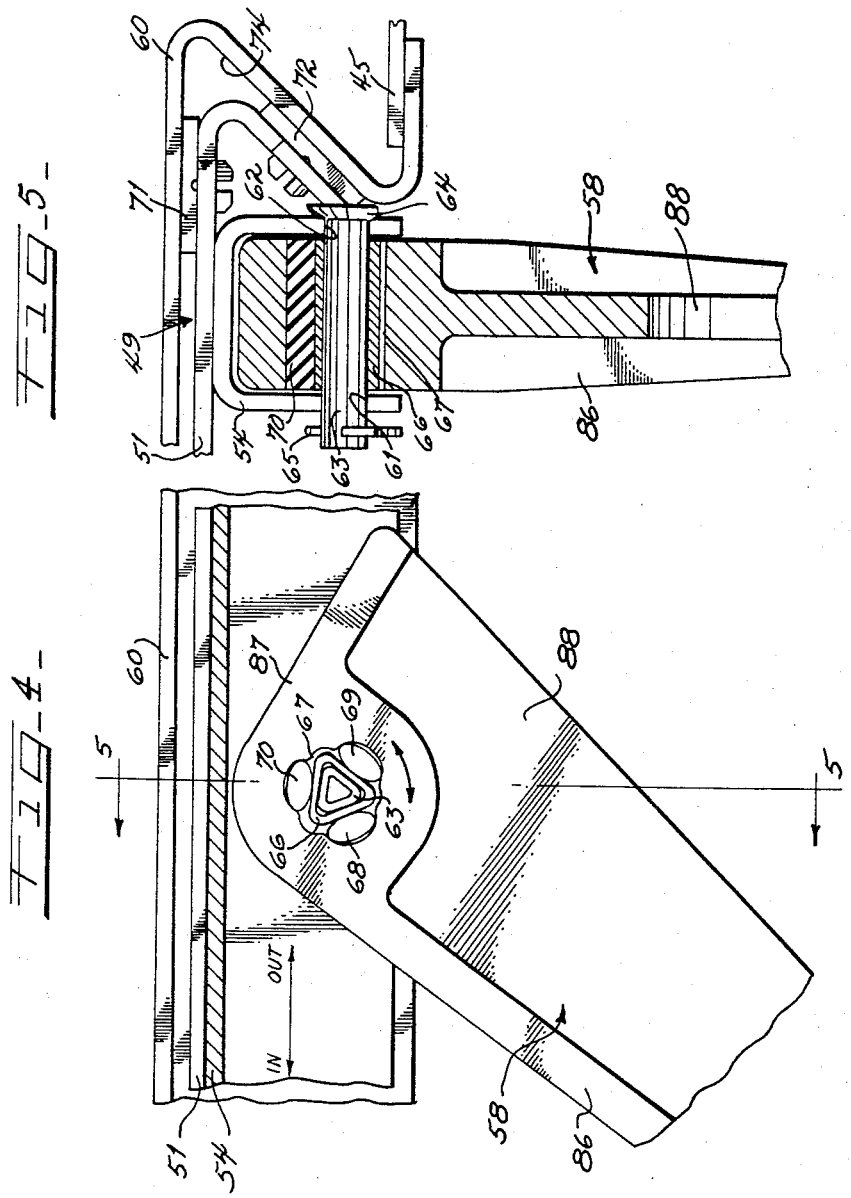

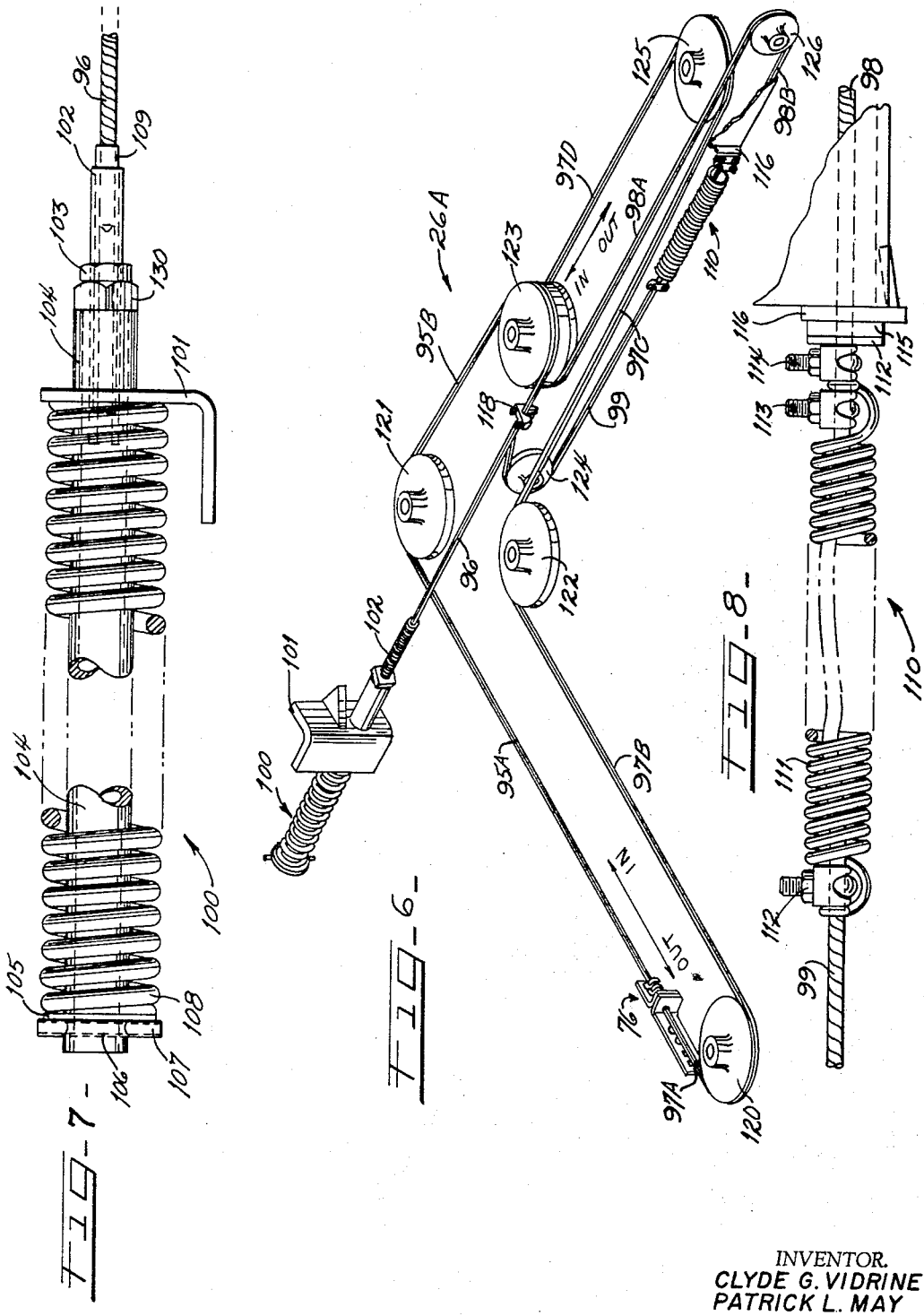

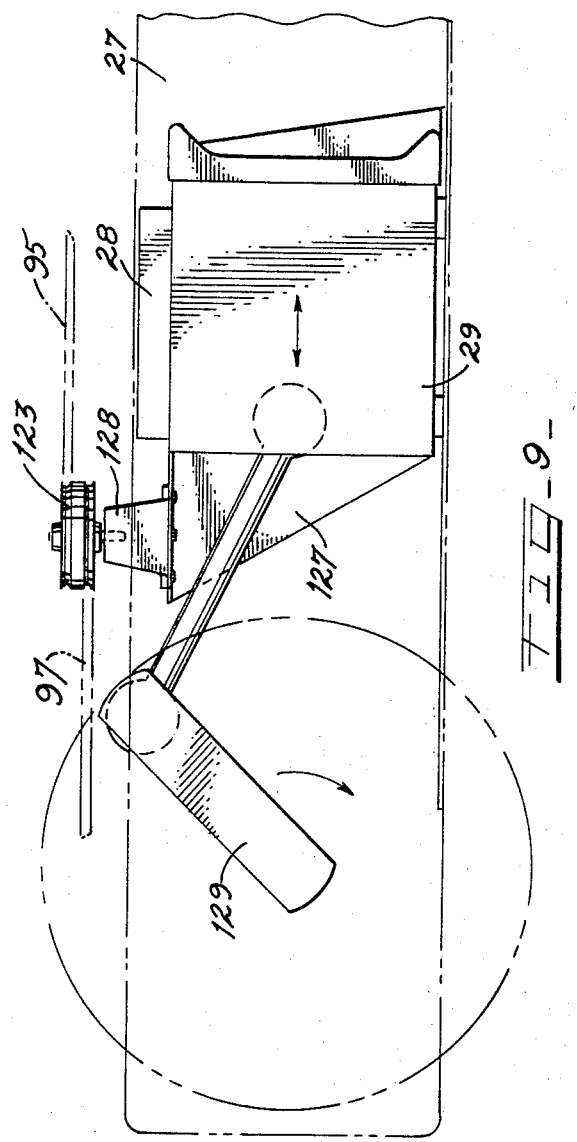

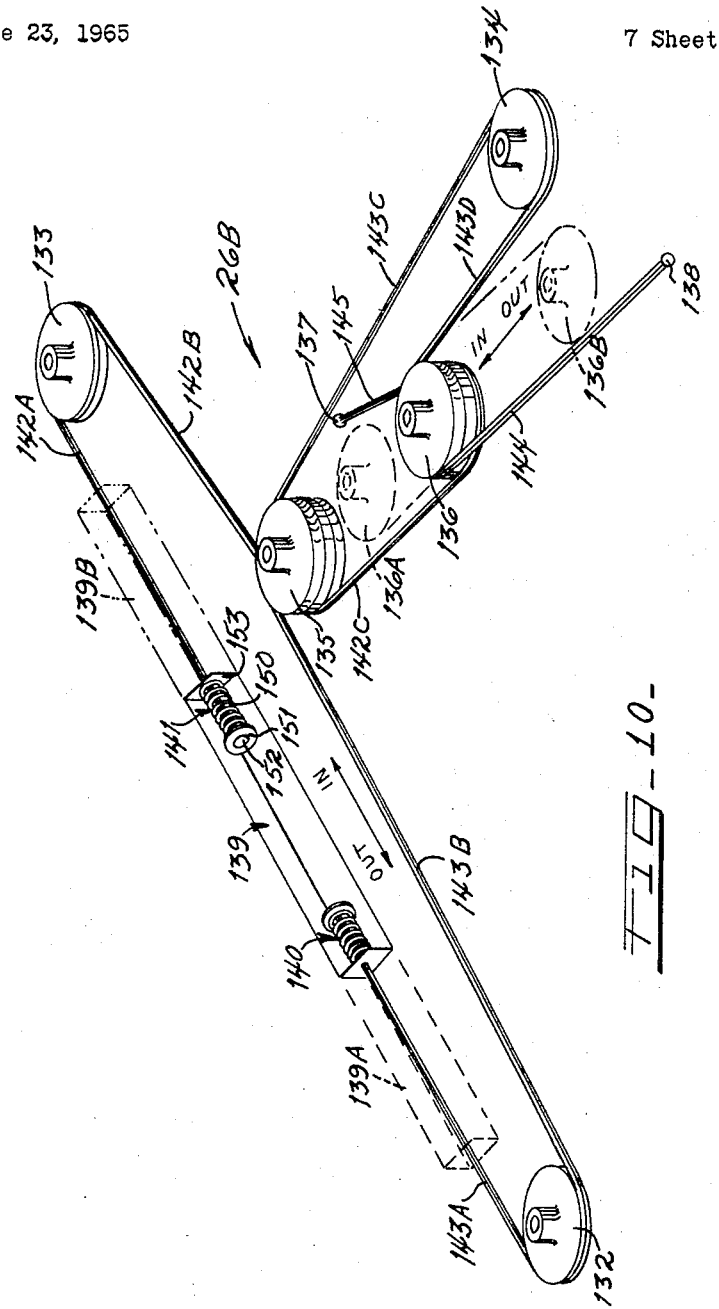

United States Patent Office 3,374,729
Patented Mar. 26, 1968

3,374,729
AGRICULTURAL APPARATUS
Patrick L. May, Memphis, Tenn., Clyde G. Vidrine, Thibodaux, La., and Ralph E. Beyer, Memphis, Tenn., assignors to International Harvester Company, Chicago, Ill., a corporation of Delaware
Filed June 23, 1965, Ser. No. 466,327
11 Claims. (Cl. 100—142)

ABSTRACT OF THE DISCLOSURE

A feeding mechanism for a baler, and having a carriage reciprocable rectilinearly into and out of the bale chamber. The carriage is connected to the baler plunger by a cable having a feed run for moving the carriage toward the bale chamber as the plunger moves in its retractive stroke, a return run fo moving the carriage away from the bale chamber as the plunger moves in its compressive stroke and a run anchored to the baler support.

---

This invention pertains to balers, in particular to a cable drive and a cross-feed carriage for a reciprocating finger-type of cross-feed mechanism for a baler.

The conventional field traversing hay baler removes hay from the ground and deposits it on the baler pickup platform. A cross-feed mechanism then transfers the hay from the pickup platform of the baling chamber. Various types of cross-feed mechanisms are used for this purpose. A common type is the floating auger cross-feed mechanism shown in U.S. Patent No. 2,450,082. Another type is the reciprocation finger cross-feed mechanism of U.S. Patent No. 2,948,101. The present invention provides an improved drive and an improved carriage for the latter type of cross-feed mechanism.

Like all devices, these prior art cross-feed mechanisms have strong and weak points. The floating auger-type cross-feed, for example, handles hay gently, so that the hay leaves, which are high in food value, are not knocked off the stems and lost. The drives for floating auger mechanism as well as the auger are, however, expensive to manufacture. The reciprocating finger-type of cross-feed mechanism is relatively simple but has a chain and sprocket drive which is noisy and, also, relatively expensive. Further, the chain driven cross-feed mechanism can get out of time with and be damaged by the baler plunger if the chain drive "jumps" the sprocket teeth during overload conditions.

Objects

A general object of this invention is to provide an improved drive for a reciprocating finger-type of cross-feed mechanism. One specific object is to provide a relatively quiet drive means for a reciprocating finger-type of cross-feed mechanism. Another specific object is to provide a positive drive for the cross-feed mechanism of a baler, wherein timing is positive and not dependent on sliding friction or the meshing of a chain and sprocket. A further specific object is to provide a relatively simple and inexpensive drive for a reciprocating finger-type of cross-feed mechanism. An additional specific object is to provide a drive for a reciprocating finger-type of cross-feed mechanism wherein wide adjustment of the carriage feed is possible. Still another specific object is to provide a cable drive for a reciprocating finger-type cross-feed mechanism wherein the reciprocating actions of the baler plunger are amplified and used to reciprocate the cross-feed mechanism. Another general object is to provide an improved cross-feed carriage for a baler cross-feed mechanism. Specific objects of the improved cross-feed carriage are to provide a carriage structure that is self-cleaning (i.e. one from which debris is readily eliminated) and to provide a carriage structure in which the clearance between the sliding members is conveniently adjusted.

Drawings

Certain preferred modes of the invention are shown in the drawings, where:

FIG. 2 is an elevation looking toward the front of the baler of FIG. 1, showing the pickup mechanism and platform and the cross-feed mechanism, the fingers of which are shown in three different operating positions by means of solid and broken lines;

FIG. 3 is a section through the pickup mechanism and platform and the cross-feed carriage, taken on line 3—3 of FIG. 2;

FIG. 4 is an enlarged section of a portion of the carriage and a feed finger taken on line 4—4 of FIG. 3, showing detailed aspects of the pivot mounting for the finger;

FIG. 5 is a detailed end view of the pivot mounting for the fingers of the cross-feed mechanism of FIG. 4;

FIG. 6 is an isometric view of the cable drive of FIG. 1, showing in detail the arrangement of the cable runs;

FIG. 7 is a top view of the cable relief spring unit indicated at 100 in FIG. 6;

FIG. 8 is a detail of the cable tension spring assembly shown at 110 in FIG. 6;

FIG. 9 is a detailed drawing of the double groove pulley mounted on the baler plunger, showing the mode of attachment of the pulley thereto;

FIG. 10 is an isometric view of a second form of the cable drive, showing the arrangement of the cable runs.

Description

Figure 1:
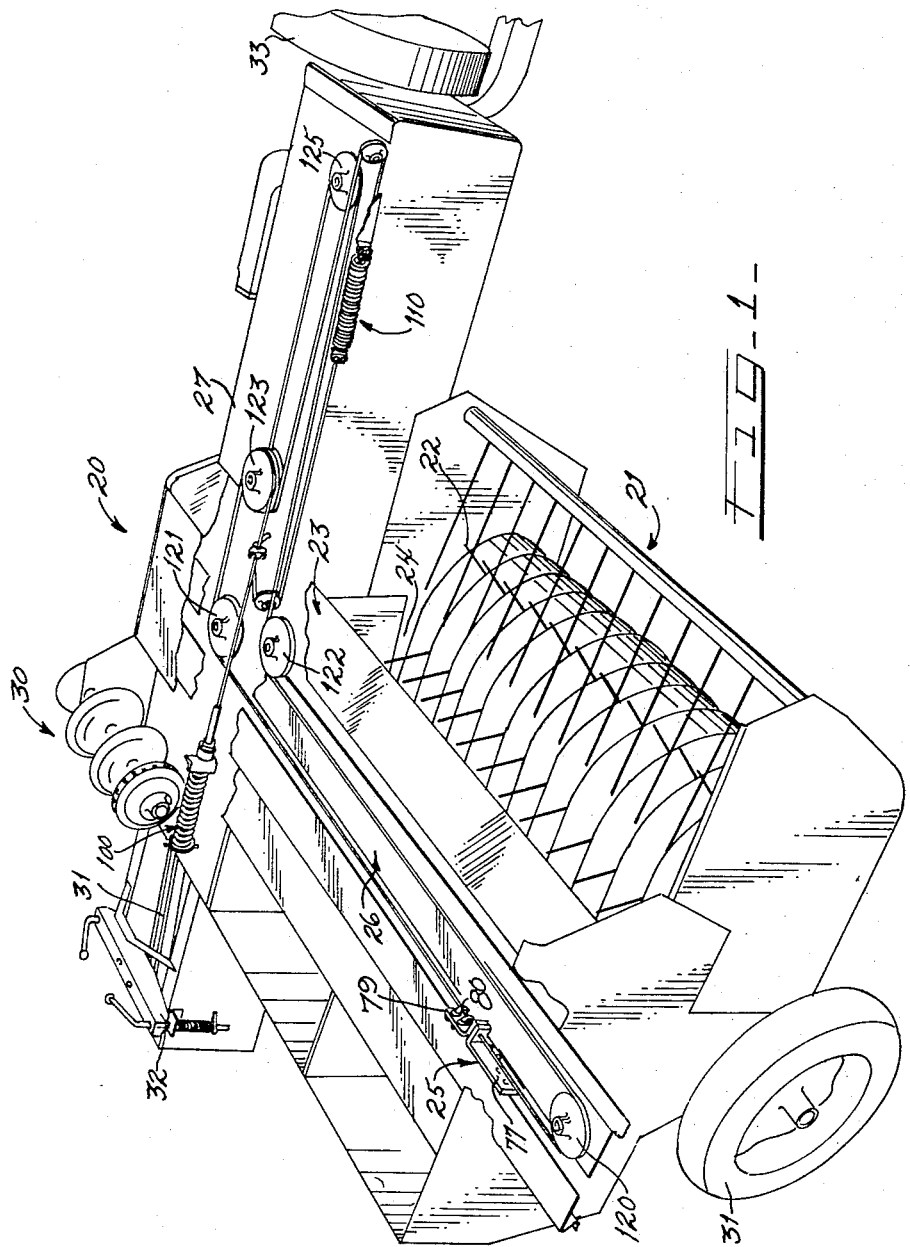
FIG. 1 is an isometric view of a hay baler, showing the relative position thereon of one form of the novel cable drive.

A typical field traversing baler 20 (FIG. 1) is mounted on wheels 31 and comprises a rotary pickup mechanism 21 having pickup fingers 22, a pickup housing 23 including a pickup platform 24, a cross-feed mechanism 25, and a baling chamber 27 containing a reciprocable plunger 29. To bale a field crop, the baler is drawn across the field by a tractor (not shown). A power takeoff connection (not shown) from the tractor drives the components of the baler, i.e. the flywheel 33, the pickup mechanism 21, the cross-feed mechanism 25, the plunger 29, and the like. As the reel 40 (FIG. 3) of pickup mechanism 21 is rotated by drive 41, the radial pickup fingers 22 remove the crop from the ground and deposit it on the platform 24. Hold-down bar 43 limits the upward travel of the crop to direct it onto platform 24. Feeding of additional crop onto the platform 24 pushes the preceding charge back onto cross-feed platform 42. Cross-feed mechanism 25, which is reciprocated by cable drive 26, then moves the crop across the platform 24, through baling chamber inlet 28, and into baling chamber 27. Plunger 29, reciprocating in chamber 27, compacts the crop into a bale. Control of bale density is maintained by a conventional density control means 32 at the rear of the baler. The completed bale is bound by a conventional binding mechanism 30 and then discharged out opening 31 at the rear of the baler. More information about the cross-feed mechanism 25 and the cable drive 26 appears below.

Cross-feed mechanism

Cross-feed mechanism 25 (FIGS. 1–5) comprises a reciprocable carriage 49, a plurality of pivoted feeder fingers 55, 56, 57, 58 and a pair of carriage guide rails 59, 60 for supporting and guiding the carriage.

Guide rails 59 and 60 (FIGS. 1–5) are in the form of angle members each of which have a downwardly facing leg and an inwardly facing leg, the downwardly facing leg being longer than the inwardly facing leg. Thus the openings of the angle members are toward one another and in a generally downward direction. The rails extend laterally of the pickup housing and reach into the upper region of the baling chamber 27. Rear guide rail 59 is mounted on rear deck 44 by means of detachable nuts and bolts. Elongated bolt holes in rail 59 permit adjustment of the rail to control the clearance between carriage 49 and rails 59 and 60. Front guide rail 60 is similar in construction to rail 59, however, its upper leg is of greater length than the corresponding leg of rear rail 59. Front rail 60 is permanently attached as by welding or the like to the front deck 45 of the pickup housing. Slot 73 separating rails 59 and 60 provides a way for travel of cable bracket 76 of carriage 49. Working surfaces 74 and 75 (FIGS. 3–5) of the rails slope downward so that thrash can fall out of the cross-feed mechanism.

Carriage 49 (FIGS. 2–5) comprises a slide 50 and a slide 51, three finger bracket channels 52, 53, 54, a plurality of fingers 55, 56, 57, and 58 and a cable bracket 76. Slides 50 and 51 are made of steel plate and are bent into a U-shape or channel section, the legs of the channel section being bent inward. Rectangular plastic guide pads 71, 72, 82, 83, 84 and 85 attached (FIGS. 2, 3, 5) to each slide provide a self-lubricating bearing surface for the slides. The guide pads also promote quiet operation. Eight such pads are used on each slide 50 and 51, four on top and four on the downwardly facing surfaces of the legs of the channel section. The guide pads shown (FIG. 5) are of the so-called "pop-in" variety and are inserted into holes in the slides, a slit in the body portion of each guide pad enabling the guide pad to be inserted in the hole. These guide pads absorb the wear imposed by the continuous sliding of the carriage along the rails 59 and 60 and can be replaced when worn.

Brackets 52, 53, 54 (FIGS. 2–5) are made of steel plate and are bent into the U-shaped cross section shown. These brackets serve as stringers, to join the slides 50 and 51 together and are welded thereto. The mouth of the U faces downward, to provide a mounting for the feeding fingers, 55, 56, 57, and 58. There are six such fingers in the actual machine but only four (55–58) appear in the drawings, the fingers behind 55 and 56 being hidden from view.

The six feeder fingers are of identical construction and are described here by reference to the finger 58 (FIGS. 4–5). The feeder fingers shown are made of a plastic for lightness and strength but can be made of aluminum or a similar metal. Lightness is desirable in the fingers to reduce the high inertia forces and noise that otherwise results from the high reciprocating speed of the cross-feed carriage, the acceleration of the fingers being about seven times the acceleration of gravity.

Each finger such as 58 comprises a thin webbed portion 88 and a flat flange portion 86 extending around the top and leading edge of the finger, the flange 86 on the leading edge being the portion of the finger that contacts the crop. At the top of the finger 58, the flange assumes a hub form 87 containing a generally triangular bore 67 for mounting the finger on a pivot. Pivot sleeve 66 of triangular cross section fits in the bore 67 and confines three rubber or resilient plugs 68, 69, 70 that act as a bi-directional torsion spring on pin 63. Before insertion in bore 67, plugs 68, 69, 70 have a circular cross section but are deformed into the oval shapes shown when assembled in hub 87. The portion of finger 58 in FIG. 4 corresponds to the solid line finger position shown in FIG. 2, which is the neutral position of the finger. Pivot pin 63 also has a triangular cross section corresponding to that of sleeve 66, a head 64, and a body portion containing a hole for cotter 65. Pivot pin 63 passes through triangular holes 61, 62 in bracket 54 and the interior of sleeve 66 and is held in place by cotter pin 65.

When carriage 25 pushes inwardly across platform 42 to baling chamber inlet 28, finger 58 pivots against rubber plugs 68 and 70 to the vertical, dotted line position in FIG. 2, thereby imparting a degree of resiliency to the finger. On the return stroke of carriage 25 to its outer position, finger 58 pivots to the horizontal, dotted line position in FIG. 2 to ride over the top of the hay on platform 42. Finger 58 pivots in this instance against the rubber plug 69 and 70, which return finger to its feeding position when the carriage arrives at the outer position. The neutral position of the finger is located about halfway between the vertical and the horizontal positions. The rubber springs act as energy absorption means to cushion the finger 58 at both ends of its pivoting action, eliminating slapping noises that would otherwise occur as the finger reverses direction. The rubber plugs, the sleeve, and the hole in the flange are proportioned to place the rubber plugs under radial compression when assembled as shown.

Carriage bracket 76 (FIGS. 1–3) is attached to the cross-feed carriage 25 and links the carriage to the cable drive 26A. Bracket 76 comprises a tab 78 that fits through a slot in the top of cross-feed carriage slide 50 and is welded thereto. At the upper end of tab 78, two L-shaped bracket elements 77 and 79 are attached to the tab 78. Element 77 is fastened to tab 78 by bolts and nuts 81. Element 79 is attached in turn to element 77 by bolts and nuts 89 passing through the abutting legs of the two L-shaped brackets. A hole through the two abutting legs acts as a guide for the cable. Two cable clamps 80 are located on the non-abutting leg of element 79. These latter clamps allow a wide range of adjustment of the carriage along the cable.

Cable drive

The cable drives, used to transmit power from the baler plunger 29 to the cross-feed carriage 25, amplify the plunger stroke, so that the cross-feed carriage travels twice the distance of the baler plunger 29. Two species of cable drive are disclosed—one species 26A being shown in FIGS. 1 and 6 and the other species 26B being shown in FIG. 10.

The species of cable drive 26A shown in FIGS. 1 and 6 comprises a continuous cable having runs 95, 96, 97, 98 and 99; a relief spring assembly 100; a tension spring assembly 110; a plurality of fixed, guide pulleys 120, 121, 122, 124, 125, 126; and a movable, double-grooved actuating pulley 123. For convenience, distinct portions of the various cable runs are identified below and in the drawings by letter suffixes, such as A, B, C, and the like.

Anchor run 96 of the cable is fastened to the baler by means of the relief spring assembly 100 (described below). From relief spring assembly 100, anchor run 96 extends forward to the double-groove pulley 123 (described below), bends around that pulley to form a driving connection and extend backward as feed run 95B. Feed run 95B extends from pulley 123 to fixed pulley 121 and bends around the latter pulley to extend laterally across the top of pickup housing 23 as feed run 95A, where it is secured to carriage bracket 76 by means of the cable clamp 80 (described below). The cable continues from the bracket 76 as return run 97A, which bends about fixed guide pulley 120 at the outboard end of the pickup housing and extends back toward the bailing chamber as return run 97B. At the baling chamber, return run 97B bends about fixed guide pulley 122 and heads toward the front of the baler as return run 97C. As fixed guide pulley 125, return cable run 97C bends thereabout and extends as return run 97D toward the double-groove pulley 123, about which it bends to form a driving connection and to reverse direction and extend back toward the front of the baler as second anchor run 98A. Anchor run 98A bends about fixed guide pulley 126 and passes through the flange 116 on the baler frame. On the other side of flange 116, tension spring unit 110 (described below) is attached to the cable. From tension spring unit 110 the cable is designated as return run 99, which extends about fixed guide pulley 124 and extends to anchor run 96, to which it (return run 99) is attached by clamp 118.

Relief spring assembly 100 attached to the end of anchor run 96 has an inner sleeve 109, which fits tightly into a bore in outer sleeve 102. Sleeve 102 is threaded along its length and is screwed into the thread of nut 130 attached to the end of tube 104. Nut 103 on outer sleeve 102 enables that sleeve to be locked in place with respect to tube 104. Tube 104 extends through a hole in bracket 101, which forms a rigid abutment on the baler. On the other side of bracket 101, tube 104 extends through a coil type compression spring 108 and projects out the far end thereof. A washer 105 on the outer end of tube 104 bears against the outer end of spring 108. A pin 107 inserted through hole 106 in tube 104 holds the relief spring assembly together, forcing spring 108 under load against bracket 101.

Spring 108 has two primary functions. One is to allow the carriage 25 and feeder fingers 55, 56, etc., to be relieved when an extra large charge of hay or some foreign object is encountered. Examples of such foreign objects are fragments of fence posts and tree roots. The second function of spring 108 is to maintain a constant tension on the cable, so that it tracks properly in the pulley grooves, and to take up any slack that develops in the cable. For these purposes spring 108 is preloaded to about 200 pounds. Constant cable tension is maintained by spring 108 from bracket 101 to flange 116 at slack spring 111, at the front end of the baler.

Each of pulleys 120, 121, 122, 124, 125 and 126 is attached to the baler to guide the various runs of the cable. While these pulleys are fixed in place, they are still free to rotate so that friction is reduced as the cable works back and forth around the pulleys.

Double-groove plunger pulley 123 (FIGS. 6, 9) is rotatably mounted on a ball bearing assembly and is supported on a standard 128 attached to a bracket 127 on the rear of baler plunger 29. As its name suggests, this pulley has two grooves for the drive cable, the grooves being located one above the other on a unitary pulley wheel member. When plunger 29 is reciprocated back and forth in the baling chamber 27 by crank mechanism 129, a point on pulley 123 moves a linear distance equal to the stroke of plunger 29.

Cable clamp 80 allows infinite adjustment of the carriage 25 along the cable runs 95A and 97A. Such adjustment is desirable so that the distance of penetration of the feeder fingers 55, 56, 57, etc., into the bale chamber 27 can be adjusted according to crop conditions to assure evenly packed bales. For example, in light crop conditions, the fingers should penetrate a greater distance into the baling chamber than for heavy crop conditions. The desired amount of penetration is attained by loosening cable clamp 80, resetting carriage 25 along the cable, and then tightening the clamp 80.

Slack spring unit 110 on the far side of the flange 116 comprises two cable clamps 113 and 114 attached to the cable to limit the distance the cable may move, two washers 112 and 115 on the cable that provide wear surfaces to separate clamp 114 from flange 116, a coil extension-type slack spring 111 attached to the cable at this point by clamps 112 and 113. Spring 111 is in an extended state when it is attached to the cable, so that the inherent tendency of the spring to contract pulls the ends of cable run 99 toward one another. Slack spring 111 therefore takes up slack in cable run 99 from flange 116 to cable clamp 118 on anchor run 96.

The second species of cable drive 26B (FIG. 10) comprises a plurality of fixed guide pulleys 132, 133, 134, and 135 for directing the cable; a movable double-groove plunger pulley 136 for transmitting plunger motion to the cross-feed carriage; two separate lengths of cable 142 and 143; and two coil spring relief devices 140 and 141. The above descriptions of the fixed guide pulleys 120, 121, etc., and double-groove pulley 123 are intended to apply to the corresponding pulleys of the second species of cable drive.

Cable 142 is attached to the cross-feed carriage 139 through the medium of relief spring device 141, which keeps cable 142 under tension and, also, provides relief for the cable in case it should become overloaded. Cable 142 extends toward the baling chamber as run 142A, which bends about fixed pulley 133 to form run 142B. The latter run bends around a stationary, double-groove pulley 135 to form run 142C, which extends to and bends about double-groove plunger pulley 136 to form anchor run 145, the end of which is secured to the baler frame at anchor 137. The last-named bend in cable 142, i.e., the bend about plunger pulley 136, is the driving connection between the cable 142 and the baler plunger.

Cable run 143 is attached to the cross-feed carriage 139 similarly to cable 142, i.e. by relief spring device 140, which keeps cable 142 under tension and allows the cable to yield if it becomes overloaded. From spring device 140, the cable 143 extends as run 143A to fixed pulley 132, making a turn thereabout to form run 143B. The latter run extends to fixed pulley 135, where it makes a quarter turn to form run 143C. Run 143C extends to fixed pulley 134, where it makes a half turn and extends as run 143D to the movable, double-groove plunger pulley 136. At pulley 136 cable 143 makes a half turn to form anchor run 144, which is anchored at point 138 to the baler structure. This last bend in cable 143, i.e. the one around pulley 136, forms a driving connection between cable 143 and the baler plunger.

Relief spring devices 140 and 141 are similar. Each such device comprises a coil-type compression spring 150, a compression plate 151, and a head element 152. The cable passes through the interior of the coil spring and out the end thereof. Head element 152, attached to the end of the cable, bears against compression plate 151, which holds spring 150 under compression. Spring 150 bears, in turn, against abutment 153 on carriage 25.

*Operation*

The operation of the species 26A of cable drive shown in FIGS. 1 and 6 is as follows: As plunger pulley 123 moves out, as indicated by the two-headed arrow in FIG. 6, it pulls on feed runs 95A and 95B of the cable, thereby moving carriage bracket 76 in toward the baling chamber. Since the anchor run 96 of the cable is fixed, only the cable in runs 95, 97 and 98 is moved by movement of plunger pulley 123. As plunger pulley 123 moves out, run 95B and the run opposite thereto (anchor run 96) become greater in length. Cable to provide this greater length is acquired from runs 97D and 98A. In other words, as plunger pulley 123 moves out, slack tends to be created in runs 97D and 98A. However, since runs 95B and 96 are simultaneously increasing in length at an equal rate, the slack in runs 97D and 98A is immediately taken up and absorbed into runs 95B and 96. This slack wire moves from runs 98A into run 97D, about pulley 125 to run 97C, about pulley 122 to run 97B, and about pulley 120 to run 97A to bracket 76, which pulls the slack toward pulley 121. Bracket 76 moves twice the distance that pulley 123 moves, since cable run 95A supplies the cable for both runs of cable 95B and 96 to increase in length.

When plunger pulley 123 moves in (left), as shown by the two-headed arrow in FIG. 6, pulley 123 pulls on cable runs 97D and 98A, the pull being transmitted via cable run 97C, 97B and 97A to the bracket 76, to pull carriage 25 in an outwardly direction. As plunger pulley 123 moves to the left (in), slack is created in cable runs 95B and 96, but this slack is immediately taken up at an equal rate by cable run 97D and 98A. In the actual machine, the plunger stroke is about twenty-eight inches; whereas the cross-feed carriage stroke is about fifty-six inches.

The operation of the species 26B of cable drive of FIG. 10 is as follows: As plunger pulley 136 moves out, as indicated by the two-headed arrow in FIG. 10, it pulls on feed runs 142A–B–C of the cable, thereby moving carriage bracket 139 toward the baling chamber. Since anchor run 145 of the cable is fixed, only the cable in runs 142A–B–C is moved by outward movement of plunger pulley 136. Run 142C and the run opposite thereto (anchor run 145) become greater in length. Cable to provide this greater length is acquired from run 142A. As plunger pulley 136 moves out, slack is created in runs 143D and 144. However, since run 143A simultaneously increases in length at the same rate as run 142A decreases in length, the slack in runs 143D and 144 is immediately taken up and absorbed into run 143A. This slack wire moves from run 144 into run 143D, about pulley 134 into run 143C, about pulley 135 into run 143B, and about pulley 132 into run 143A to bracket 139, which pulls the slack toward pulley 133. Bracket 139 moves twice the distance of pulley 136, since both runs of cable 142C and 145 increase in length and acquire this increased length directly from run 142A.

When plunger pulley 136 moves in, as shown by the two-headed arrow in FIG. 10, pulley 136 pulls on carriage bracket 139, the pull being transmitted via cable runs 144, 143D, 143C, 143B, and 143A to the bracket 139, to pull carriage 25 in an outwardly direction. As plunger pulley 136 moves to the in (left), slack is created in cable run 142C and 145, but this slack is immediately taken up into run 142A, which increases in length at the same rate that run 143A decreases in length.

Overload conditions: with either species of cable drive, should the cross-feed carriage 23 be blocked by an obstruction such as a fence post or large root, the relief spring 108 will yield and prevent damage to the cross-feed fingers. For example, in the species of FIG. 6, overload conditions will cause pulley 123 to pull on cable run 96 and compress spring 108 in spring assembly 100, displacing cable from the relief spring side rather than the feeder carriage side. On overload of a species of FIG. 10, the spring relief unit 141 compresses in a similar manner, allowing the cable to be pulled without a corresponding movement of the carriage 139.

Stretching of the cables in either species is also compensated for by the relief spring units. The springs in the relief units are preloaded, so that as the cable stretches, the slack is taken up by a corresponding expansion of the respective compression spring.

The above description covers only the preferred modes of this invention and is not intended to limit the invention to those modes, since the invention embraces all equivalent forms that fall within the spirit and scope of the attached claims. Specific details have been given as illustrations only and are not to be construed as limitations on the invention.

The invention claimed is:

1. A drive for the cross-feed carriage of a baler having a supporting structure, a baling chamber on said supporting structure, bale compacting means operable in said baling chamber, drive means connected to said compacting means for movement thereof on a bale compaction stroke and on a reverse stroke, a pickup housing on said supporting structure, a feed passage leading from said pickup housing into said baling chamber, a cross-feed carriage movable in said pickup housing on a feed stroke and on a return stroke, said feed stroke extending from an outer position remote from said feed passage to an inner position adjacent said feed passage, said return stroke extending from said inner position to said outer position, said cross-feed carriage drive comprising: a guide, means for effecting reciprocation of said guide, said reciprocation being in timed relation to and parallel to reciprocation of said compacting means, elongated, flexible, force-transmitting means for moving said cross-feed carriage on said feed stroke in response to the movement of said bale compacting means on said reverse stroke, said last-named means including a feed run, means on said feed run for attachment thereof to said cross-feed carriage, said feed run extending from said attachment means thereon to said guide, said feed run bending around said guide on one side thereof and extending therefrom as an anchor run, said anchor run including means for attachment thereof to said supporting structure, other means including means for attachment thereof to said cross-feed carriage responsive to movement of said bale compacting means on said bale compaction stroke for moving said cross-feed carriage on said return stroke when said bale compaction means moves on said bale compaction stroke.

2. A drive as recited in claim 1, wherein: said other means is an elongated, flexible, force-transmitting means including a return run having means thereon for attachment to said cross-feed carriage, said return run extending from said attachment means thereon to said guide, said return run bending around said guide on the side thereof opposite to said bend of said feed run about said guide, said return run extending from said guide as a second anchor run, said second anchor run including means for attachment thereof to said supporting structure.

3. A drive as recited in claim 2, wherein: said elongated, flexible, force-transmitting means are cables and one of said feed run and said return run includes resilient means for relief of an overload imposed on said drive.

4. A drive for the cross-feed carriage of a baler having a supporting structure, a baling chamber on said supporting structure, bale compacting means operable in said baling chamber, drive means connected to said compacting means for movement thereof on a bale compaction stroke and on a reverse stroke, a pickup housing on said supporting structure, a feed passage leading from said pickup housing into said baling chamber, a cross-feed carriage movable in said pickup housing on a feed stroke and on a return stroke, said feed stroke extending from an outer position remote from said feed passage to an inner position adjacent said feed passage, said return stroke extending from said inner position to said outer position, said cross-feed carriage drive comprising: a first guide, support means on said first guide for attachment thereof to said supporting structure adjacent said inner position of said cross-feed carriage, a second guide, support means on said second guide for attachment thereof to said supporting structure adjacent said outer position of said cross-feed carriage, a third guide, support means on said third guide for attachment thereof to said supporting structure intermediate said first and said second guides, a fourth guide, means on said fourth guide for effecting movement thereof by said bale compacting means, elongated, flexible, force-transmitting means for moving said cross-feed carriage on said feed stroke and said return stroke in response to the movements of said bale compacting means on, respectively, said reverse stroke and on said compaction stroke, means on said elongated, flexible, force-transmitting means for attachment thereof to said cross-feed carriage, said elongated, flexible, force-transmitting means including a feed run, said feed run extending from said attachment means to said first guide, said feed run bending about said first guide and extending therefrom to said fourth guide, said feed run bending around said fourth guide to the far side thereof and extending away therefrom as a first anchor run, said first anchor run including means for attachment thereof to said supporting structure, said elongated, flexible, force-transmitting means also including a return run, said return run extending from said means for attachment of said elongated, flexible, force-transmitting means to said cross-feed carriage to said second guide, said return run bending about said second guide and extending therefrom to said third guide, said return run bending about said third guide and extending therefrom to said fourth guide, said return run bending about said fourth guide on the side thereof opposite to said feed run and extending therefrom as a second anchor run, said second anchor run including means for attachment thereof to said supporting structure.

5. A drive as recited in claim 4, wherein: said elongated, flexible, force-transmitting means is a cable and includes resilient means for relief of an overload imposed on said drive.

6. A drive as recited in claim 4, wherein: said elongated flexible, force-transmitting means is a cable, said first anchor run includes spring relief means, said drive includes a fifth guide, support means on said fifth guide for attachment thereof to said supporting structure on said far side of said fourth guide, said return run intermediate said third guide and said fourth guide bending about said fifth guide and extending therefrom to said opposite side of said fourth guide.

7. A drive as recited in claim 6, wherein: said spring relief means comprises a coil compression spring, an abutment for mounting on said supporting structure, said first anchor run extends through said coil spring, said first anchor run having a collar bearing against the non-abutting end of said coil spring.

8. A drive as recited in claim 6, wherein: said second anchor run includes a stop for abutting against said supporting structure, and a terminal run portion beyond said stop, said terminal run portion being attached to said first anchor run, a tension spring comprising a coil spring in extended condition surrounding said terminal run and connected thereto to absorb slack in said terminal run portion.

9. A drive as recited in claim 4, wherein: said means for attachment of said elongated, flexible, force-transmitting means to said cross-feed carriage includes spring means for maintaining said feed and return runs taut, said feed run intermediate said first guide and said fourth guide bending about said third guide and extending therefrom to form said bend around said fourth guide, and said drive includes a fifth guide, support means on said fifth guide for attachment thereof to said supporting structure on said far side of said fourth guide, said return run intermediate said third guide and said fourth guide bending about said fifth guide and extending therefrom to form said bend on said opposite side of said fourth guide.

10. A drive as recited in claim 9, wherein: said spring means includes a preloaded coil compression spring on the end of said feed run and a preloaded coil compression spring on the end of said return run.

11. A cross feed mechanism for a baler of the type having a frame structure defining a bale chamber and a plunger reciprocable in said bale chamber for forming bales of hay, said bale chamber including a hay receiving opening in one side thereof, said feed mechanism comprising: support means extending outwardly from said opening and perpendicularly from the longitudinal axis of said bale chamber, a carriage mounted on said support means and movable toward and away from said opening; drive means connected to said plunger; a single flexible strand-like member having a feed run directly interconnecting said drive means and said carriage for moving said carriage toward said opening as said plunger moves away from said bale chamber, and a return run directly interconnecting said carriage and said drive means for moving said carriage away from said opening as said plunger moves toward said bale chamber, said flexible member having its opposite ends anchored to said frame structure.

References Cited
UNITED STATES PATENTS

| | | | |
|---|---|---|---|
| 405,034 | 6/1889 | Hooton et al. | 100—141 X |
| 410,679 | 9/1889 | Sooy | 100—142 X |
| 521,193 | 6/1894 | Tuttle | 100—142 |
| 667,376 | 2/1901 | Tuttle | 100—142 X |
| 779,736 | 1/1905 | Richmond | 100—142 |
| 1,084,735 | 1/1914 | Groover | 100—142 |
| 1,844,873 | 2/1932 | Smith. | |
| 2,757,602 | 8/1956 | Nolt | 100—142 |
| 2,929,313 | 3/1960 | Luthman et al. | 100—142 |
| 2,948,101 | 8/1960 | Long | 100—142 X |
| 3,068,784 | 12/1962 | McDuffie et al. | 100—142 |
| 3,150,585 | 9/1964 | Sterner | 100—25 |

LOUIS O. MAASSEL, *Primary Examiner.*